United States Patent [19]

Curry

[11] Patent Number: 5,229,760
[45] Date of Patent: Jul. 20, 1993

[54] ARITHMETIC TECHNIQUE FOR VARIABLE RESOLUTION PRINTING IN A ROS

[75] Inventor: Douglas N. Curry, Menlo Park, Calif.

[73] Assignee: Xerox Corporation, Stamford, Conn.

[21] Appl. No.: 545,744

[22] Filed: Jun. 28, 1990

[51] Int. Cl.⁵ .............................................. G09G 1/14
[52] U.S. Cl. ................................... 340/744; 340/767; 358/140
[58] Field of Search ............... 340/723, 744, 767, 793; 358/22, 445, 453, 139, 474, 140, 11

[56] References Cited

U.S. PATENT DOCUMENTS

| | | | |
|---|---|---|---|
| 4,466,014 | 8/1984 | Wilensky et al. | 358/139 |
| 4,485,394 | 11/1984 | Ghaem-Maghami et al. | 358/139 |
| 4,733,299 | 3/1988 | Glenn | 358/140 |
| 4,740,841 | 4/1988 | Slavin | 358/139 |
| 4,837,635 | 6/1989 | Santos | 358/474 |
| 4,893,136 | 1/1990 | Curry | 358/474 |
| 4,951,157 | 8/1990 | Koh et al. | 358/474 |
| 4,994,912 | 2/1991 | Lumelsky et al. | 358/22 |
| 5,014,129 | 5/1991 | Imanishi | 340/793 |

Primary Examiner—Ulysses Weldon
Assistant Examiner—M. Fatahiyar
Attorney, Agent, or Firm—Robert E. Cunha

[57] ABSTRACT

In a raster output scanner, a method of switching video from one raster to the next during a scan without the creation of a visible artifact. A position encoder is used to determine the position of each raster on the photoreceptor, a first distance above the transition point and a second distance below the transition point, in the process direction. Above the first point the video will be supplied by the first raster, and below the second point the video will be supplied by the second raster. From the first point to the transition point the duty cycle will vary from 100% of data from the first raster to 50% from each raster. From the transition point to the second point the duty cycle will vary from 50% to 100% supplied by the second raster. In this way, there is a gradual, and invisible, transition from one raster to the next.

2 Claims, 3 Drawing Sheets

ARITHMETIC TECHNIQUE FOR VARIABLE RESOLUTION PRINTING IN A ROS

BACKGROUND OF THE INVENTION

This is a circuit for allowing a fractional number of scans to be used to expose each data raster in a raster output scanner (ROS), and more specifically is a circuit for allowing a single scan to start with video data from one raster, and switch at any point to the data of the next raster, without a visible artifact at the point of switching.

In the simplest case a raster output scanned device has one scan per raster. An example is a scan generated by a rotating polygon which is used to scan an image onto a photoreceptor. At the start of scan (SOS) one line of video is clocked out and used to modulate the beam intensity to produce one raster. It is also possible to use two or more scans for each raster. In this case the video for all of the scans in a raster is identical.

A problem arises when the scan and raster pixel densities required are not multiples of each other. Assume, for example, that a 240 spot per inch video generator is being used to drive a 350 spot per inch printer. In the scan direction, the clock speed of the video can be varied to match the scan speed to result in the proper image width. However, in the process direction, matching the video rate to the printer's number of scans per inch is a very difficult process. The number of scans per inch at the printer is normally not variable so the only method is to convert the video electronically, in this example, from 240 to 350 scans per inch. This can be done by converting the entire image to a continuous gray scale image using some numerical process, and then converting that continuous image into the desired 350 scan lines per inch. Of course, in the process, much computer time and memory is consumed, and there is inevitably a loss of detail.

A better method of making a fractional adjustment in the number of scan lines per inch is required. One solution proceeds from the concept that there can be a fractional number of scans per raster. For example, in a system where the ROS produces eight scans in the time the data generator takes to produce three data lines, or rasters, then the system can assign 2⅔ scan lines for each raster. In other words, the same data will be sent to the ROS for the first two lines. For the third line, the first raster data will be used for the first two thirds and the second raster data will be used for the last third of the third scan. Next, the second raster data will be used for the next 2⅓ lines. Finally the third raster data will be used for the last two thirds of the sixth scan line and for the next two entire scan lines. In this way, three equal rasters have been printed from eight scans.

A remaining problem is that the transition point where the scan switches data from one raster to the next will have a visible artifact. A method of making this artifact invisible to the eye is required.

SUMMARY OF THE INVENTION

As the video switches from one raster to the next, there may be a visible transition. For example, in the worst case, the abrupt transition between a white raster and a black raster may be visible. To spread out this transition, the raster can be made to transition gradually from light to dark gray. In an analog display this can be accomplished by varying the intensity of the beam. However, in the digital case, it is taught here to divide each pixel into a duty cycle of two parts. During the first portion the first raster data will be used, during the second portion the second raster data will be used. Then, by varying the duty cycle, the transition can be made to vary smoothly from one color to the next without a visible artifact being produced.

DETAILED DESCRIPTION OF THE INVENTION

Flying spot scanners, also known as raster output scanners, conventionally have a reflective, multifaceted polygon which is rotated about its central axis to repeatedly sweep one or more intensity modulated light beams across a photosensitive recording medium in a fast scan, or line scanning, direction while the recording medium is being advanced in an orthogonal slow scan, or process, direction, such that the beam or beams scan the recording medium in accordance with a raster scanning pattern. Digital printing is performed by serially intensity modulating each of the beams in accordance with a binary sample stream, whereby the recording medium is exposed to the image represented by the samples as it is being scanned.

As is known, the quality of the image printed by a digital printer depends to a substantial extent upon the precision with which the individual picture elements, pixels, of the printed image are positioned on the recording medium. In the process direction, the spacing of scan lines must be precise in order to produce halftone images which are free of artifacts caused by polygon facet wobble, cogging of the process gear train, process motor speed variation, or other process anomalies which contribute to unequal spacing of scans.

Typically, a start of scan detector is used to synchronize the flying spot or spots to the data rasters, and one raster of data is output for each scan by each spot. With each new start of scan signal, a particular raster is output. With some scanning schemes, such as "line doubling", or "line tripling", a particular data raster is output two or more times during the two or more scans. This has the advantage of blurring out some polygon wobble, but has the disadvantage of requiring a polygon RPM two or three times that which would normally be required. Moreover, data raster separation is limited to integer multiples of the scan separation, precluding the ability to do either velocity compensation or density control except at a relatively coarse (scan spacing) resolution.

The system described here will provide velocity compensation and raster density control on arbitrarily fine resolution in the process direction, and relies on the disassociation of the start of scan signal from the transfer of modulation from one data raster to the next, and instead, uses the spatial position of the exposure medium to determine which raster is to be output. Instead of beginning and ending each raster during the "flyback"

portion of the fast scan, transfer to the next raster may be initiated during a scan.

Figure 1:
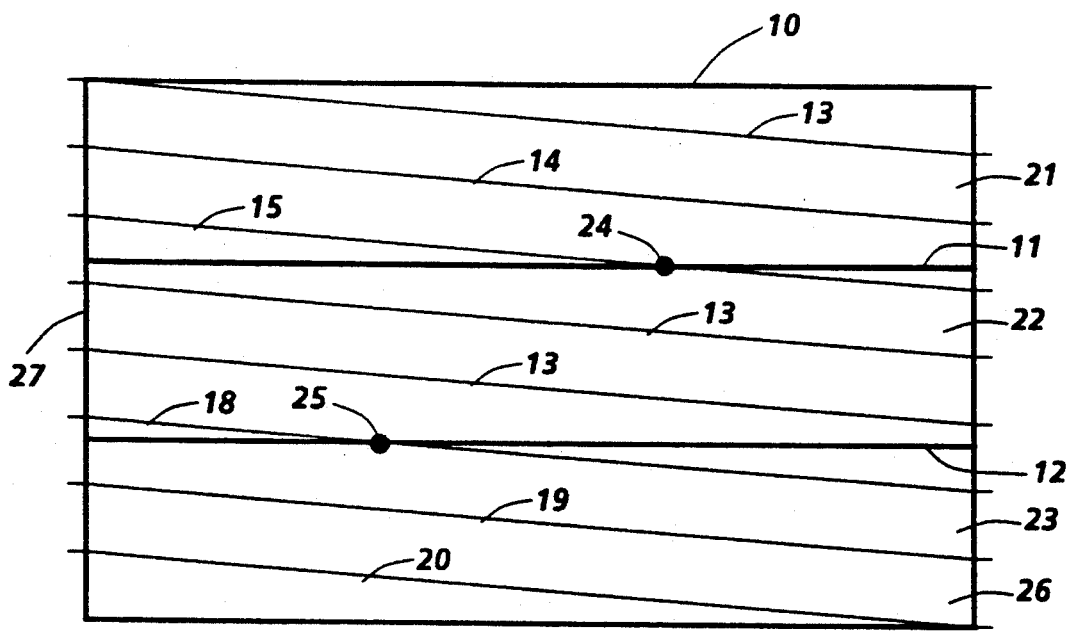
FIG. 1 is a diagram showing eight scans being used to produce three rasters.

An example of this variable relationship between scans and rasters is shown in FIG. 1. Assume a rectangular area of the photoreceptor bounded on the left side by the line defining the start of scan 27, and on the right side by the line defining the end of scan 26. Also, the rectangle comprises the top three rasters of the image, rasters 21, 22 and 23. Now assume scan lines 13 through 20 having a frequency such that 8 scans will cover the three rasters. Now, in accordance with this invention, the image data for the first raster will be supplied to the entire first scan 13, the identical data will be supplied to the second full scan 14, and the same data will be supplied to the third scan 15, but only for the first 2/3 of the scan. At point 24 a transition will occur and the data will be switched over to raster 22 data. If, for example, the first raster 21 is white and the second raster 22 is black, then white pixels will be supplied to scans 13 and 14 and to the first two thirds of scan 15. At the transition point 24, the image data will be switched, and thereafter black pixels will be supplied to the remainder of scan 15, to all of scans 16 and 17 and to the first third of scan 18.

It can now be seen that this technique can be used to match any number of scans to any number of data rasters while maintaining the absolute accuracy of every raster dimension in the process direction. Not only will this technique adapt a particular scan speed to a different raster density, but it will also compensate for process speed variations, since the actual position of the rasters, and not the nominal amount of time between rasters, can be the mechanism by which the start of each raster is determined.

As can be appreciated, switching from one data raster to another in the middle of a scan may cause visual artifacts without the presence of some sort of compensating technique. These artifacts can be described as the beating of the raster frequency with the scan frequency. By increasing the number of scans per raster, these high frequency artifacts may be blurred as in the case of scan doubling or tripling.

It is not necessary to increase the polygon rotation rate to increase the number of scans per raster. Indeed, this may be prohibitive in cost. An alternate way is to provide multiple spot scanning with an electronic raster cache memory which contains the last n rasters output, where n is the number of rasters spanned by the multiple spots instantaneously on the exposure medium plus one. As each point on the exposure medium passes under the space occupied by a particular scanning beam, the raster associated with that position is output regardless of polygon angular velocity or phase.

Figure 2:
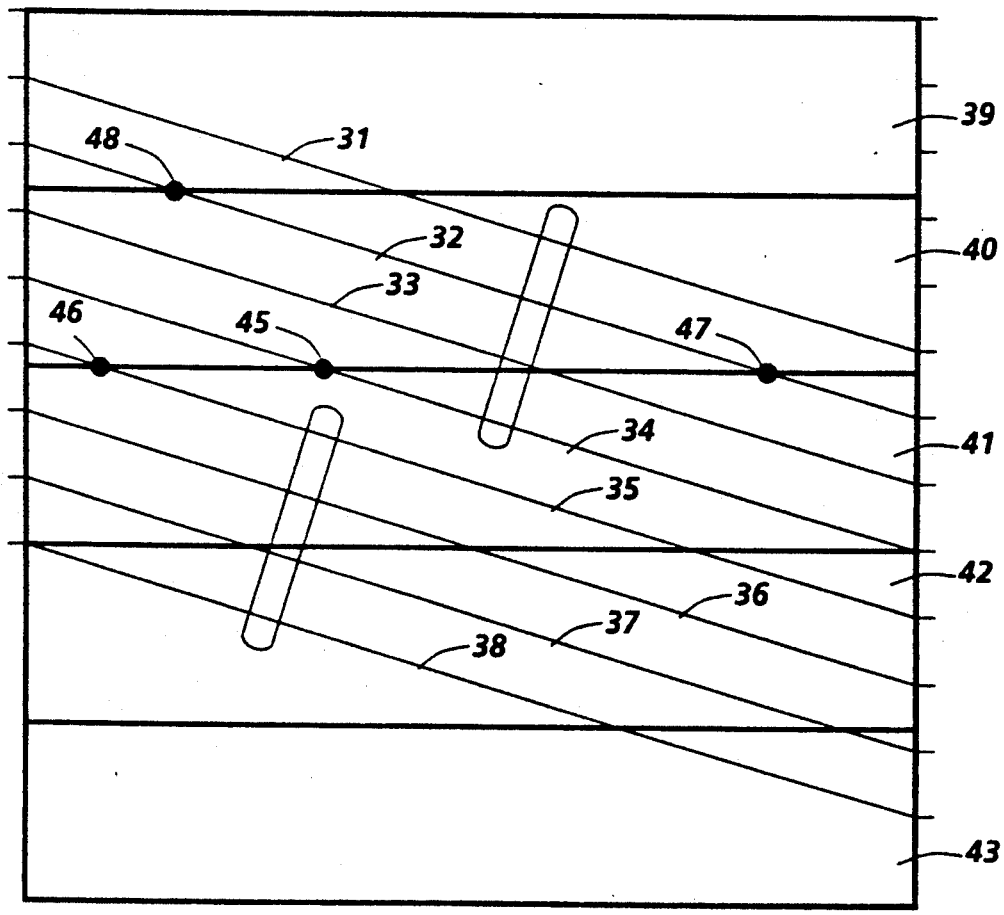
FIG. 2 is a diagram showing the process for generating rasters by a beam generator which generates four beams at the same time.

FIG. 2 shows such a system having four spots scanning the photoreceptor at the same time. Note that the spacing between beams has been set to one scan for simplicity in explanation, although it will be assumed that the beam spacing may be set to any desired value, for instance three, in which interlacing would be used to fill in the exposure. The first set of spots 31-34 scans the photoreceptor as shown, followed by the next scan with spots 35-38. In the worst case one set of spots will enter four rasters, as shown by the second set comprising spots 35-38, which enter parts of rasters 40-43. Therefore, including one extra raster buffer to receive a new raster, the data generator must have a raster buffer holding at least five rasters of data. The first spot travels through parts of rasters 40, 41 and 42 while the last spot 38 also enters raster 43. As each spot reaches the raster boundary, for example at points 48 and 44, the video to the spot will be switched, here from raster 39 to raster 40.

In a conventional ROS the rasters are parallel to the scans, which are slightly diagonal, since the exposure medium moves a distance as the spot is moved horizontally. In contrast, for the invention described here, the rasters are horizontal as the boundaries between rasters are now dependent on exposure medium position rather than scan number. A particular raster will be composed of the sum of the exposures from each of the spots in the multiple beam system. By controlling the rate at which rasters are incremented as the spots pass over the recording medium, variable density at arbitrarily high resolution may be achieved.

A particular artifact that will occur in an image generated by this system is caused by switching from one raster to another while in the middle of a scan. If this were to occur only once during the printing of an image, the artifact might be invisible, overwhelmed by the random noise in the image. However, this switching might occur once per raster for each beam, and, if the process speed is uniform at one raster per scan, the switching will occur at the same horizontal position during each scan, producing an easily recognizable vertical artifact down the length of the image. In practice, however, the process is not constant, but varying, and is speeding up or slowing down in a process is not constant, but varying, and is speeding up or slowing down in a more or less erratic sinusoidal manner, which causes the vertical artifact to be distended to the left or right in an equally erratic manner, producing an artifact which runs in an undulating line down the image. A process for eliminating this artifact will be described below.

To determine where the transition points should be if it is desired to achieve motion control, a rotary encoder, or other velocity or position measuring device, may be attached to the exposure medium as a means to determine process velocity. The pulses produced by such a device may be used directly as an indication of process position, but only if the desired raster density matches the density of the encoder. More likely, however, there will be fewer pulses per process inch emitted from the measuring device than there are raster per inch, for reasons of economy. In order to produce a raster clock, a clock with a frequency of one cycle per raster, with a frequency proportional to the process velocity, some sort of frequency multiplication is necessary.

One way to produce such a multiplied clock is to use a frequency synthesizer based on arithmetic, see U.S. Pat. No. 4,766,560, "Parallel/Pipelined Arithmetic Variable Clock Frequency Synthesizer", for teachings on the basic frequency synthesis technique, and U.S. Pat. No. 4,893,136, "Arithmetically Computed Motor Hunt Compensation for Flying Spot Scanners" for a discussion of fast scan compensation which uses a computation technique similar to the one used here. For slow scan positioning errors, such a method may be used to produce a raster clock at any desired nominal raster density, with frequency variations designed to produce rasters of constant density on the recording medium. An important aspect of this frequency synthesis technique is that numbers are used to generate frequencies, and phase shifts may be generated by appropriate modification of these numbers through arithmetic techniques.

Referring to the artifact previously mentioned, it is apparent that such a problem exists to the extent that the switching of rasters from scan to scan produces a trail which the eye can easily follow down the page. To alleviate this problem, dividing each pixel within a predetermined distance to the right and left of the transition into portions, the size of each being determined by a variable duty cycle, may be employed to spread out the transition, destroying the visible trail in the process.

In this invention, two significant tradeoffs are being made. First (although a single beam system theoretically may be used), a multiple spot scanning system can be used for raster density and/or process control with closer scan spacing rather than higher speed printing. Each spot is being modulated by the entire contents of the source data file, not a fraction as in conventional interlacing. Since each square inch of recording medium is being exposed once per beam, lower exposure levels per beam are required. Second, The transition, which should theoretically occur at a point, will be blurred over a distance, reducing the detail to some extent. However, this can be minimized by experimentally determining the minimum distance required to eliminate the visibility of the artifact.

Due to physical limitations of scanner technology, most printers are built to perform at a particular bit density. It is generally not feasible to use a data file already halftoned or formatted to a particular density on a printer designed for a different density since the image will physically be enlarged or minified in accordance with the fixed density of the printer. For example, an 8½"×11" file at 300 by 300 pixels per inch would be 6.4"×8.3" when printed on a 400 spi printer. Parallel printing methods such as diode arrays, with fixed spacing of printing elements in the fast scan direction, are able to vary density only in the slow scan direction. Polygon scanners, although quite able to vary density in the fast scan direction, have had a fixed density imposed by the unalterable separation of rasters in the slow scan direction. It should be noted that varying the speed of the polygon to achieve variable slow scan density has proved unsuccessful in the past in part due to the time it takes the polygon to servo to the appropriate speed. With this invention, it will be feasible to print files formatted for a wide variety of densities on the same printer. Indeed, it is quite possible to merge data of different densities into the same image.

In the past, process speed variation, such as that caused by gear cogging, sun gear runout, and process motor speed variation, have been an impediment to high quality reproduction. Other problems such as polygon wobble, or color pass registration in color printers affect the quality of the reproduction. Usually, these problems have been solved by providing gear trains, motors, and mechanical parts of such high quality that these problems are reduced to an acceptable level, but this may have a high cost associated with it. By monitoring the process speed and/or position in real time, and sending this information back to the density control electronics, these problems may be alleviated to some extent by this invention, depending on the accuracy and resolution of the process speed and position information.

Figure 3:
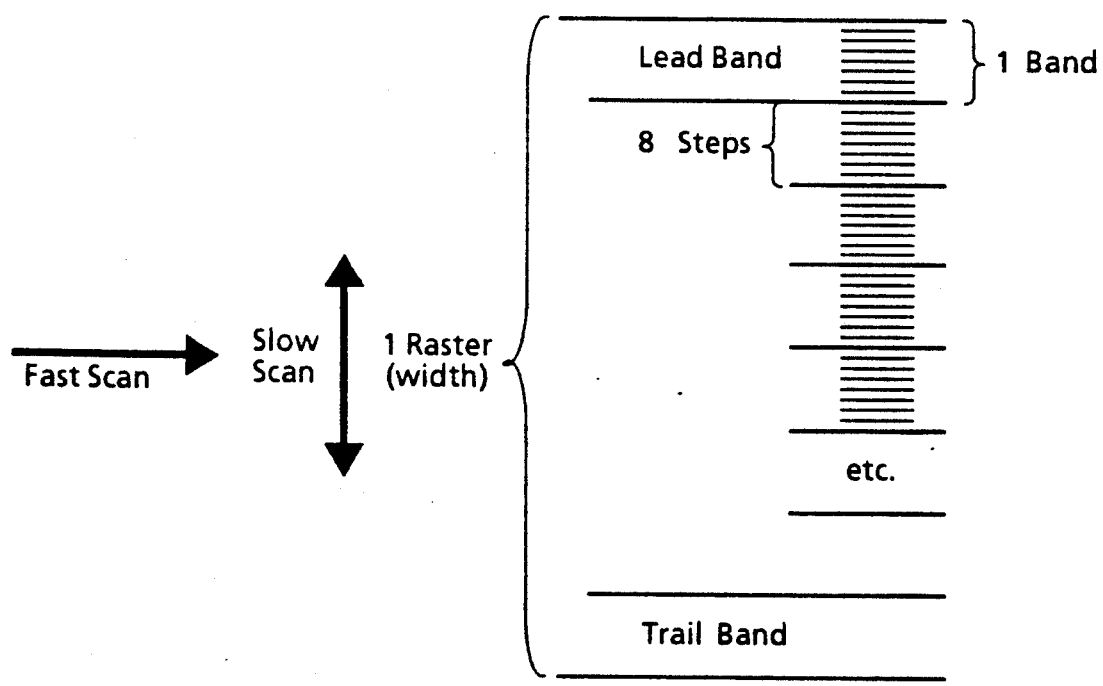
FIG. 3 is a diagram showing how the raster may be divided into bands and steps.

It would be useful to describe this method of raster transition modulation by introducing a less coarse unit to measure the spot's vertical position. Rasters may be visualized as thin horizontal strips of uniform size called bands, the trailing band of any raster abutting the leading band of the next raster at the raster-to-raster boundary. This is shown in FIG. 3. The raster band field, minus the leading and trailing bands, is called the raster median width. The boundaries between rasters are spaced at the reciprocal of the raster density. As the spot moves vertically, its position may be measured in units of bands.

To continue with measurement of vertical position, it is helpful to further subdivide a raster band into a number of even finer uniform slices called steps. Again, these steps are a measure of distance inside the band field.

For the following discussion, the term "duty cycle" will be defined as the ratio between (logical true) and (logical true plus false) times 100 percent in a periodic logical signal. For example, a duty cycle of 0% means that the signal is always false, and a duty cycle of 40% means that the signal is true during 40% of the signal's period. The signal is assumed to be periodic.

The invention described here is a method of blurring the raster-to-raster transitions using pulse width modulation, which is controlled by the vertical position of the photoreceptor with respect to the spot. As the spot moves vertically from inside the trailing band of one raster to inside the leading band of the next adjacent raster, the video stream will emit data from both rasters with a duty cycle for the data from the current raster equal to the absolute value of the step distance that the spot is inside the band field of that raster, as measured from the raster-to-raster boundary, divided by twice the band field step width, times 100%.

For instance, as the spot passes the actual raster-to-raster boundary, the duty cycle will be 50%. If the spot is in the middle of a leading or trailing band, then the duty cycle for data from that band will be 75%, while 25% of the data will come from the previous or next raster, respectively. This gradual transition of raster data during the leading and trailing band fields will blur the otherwise abrupt horizontal transition.

The following discussion explains an actual implementation of the invention. It is assumed that a counter or accumulator exists which keeps track of the spatial position of the raster on the photoreceptor, and has an integer and a fraction portion. The frequency of the most significant bit of the fractional part has units of rasters per second. The number, RasAddr, points to a particular raster in a contiguous raster memory, and is updated in a manner so that the fractional portion represents the nominal fractional position of the center of the laser spot in between the boundaries of the raster.

The most significant bit of the fractional portion of RasAddr determines which half of the raster field the spot is in: 0=the leading half. The bit is used to control an address generator which subtracts 1, in the case of the leading half, or adds 1, in the case of the trailing half, from the integer portion of RasAddr. The generated address, AltAddr, along with RasAddr, are used to access their respective raster channels from the video source.

These two raster channels are presented to a two-to-one multiplexer, the output of which is the video stream for the channel. Since only one of the source rasters will be delivered to the output, the select control line of the multiplexer will determine the proportion that either raster is emitted to the output channel. It is anticipated that for the raster position within the median width, as determined by RasAddr, the duty cycle of the select control line which enables the video stream controlled by RasAddr will be 100%, leaving 0% for the video stream controlled by AltAddr.

It is only outside the raster median width that the duty cycle of the select control line enabling the video stream controlled by RasAddr will: 1) incrementally increase, in the case of the leading band, from 50% to 100%, and 2) incrementally decrease in the case of the trailing band from 100% to 50%.

Because it is the complement, the duty cycle of the same select control line enabling the video stream controlled by AltAddr will: 3) incrementally decrease in the case of the leading band from 50% to 0%, and 4) incrementally increase in the case of the trailing band from 0% to 50%.

A circuit which can produce a periodic signal with a controlled duty cycle is an accumulator. That is, an adder with a register connected to its output, the register's output being fed back to one of the adder inputs. As the register is clocked, it will repeatedly add the number presented to the other input of the adder to its own contents. The carryout of this adder will have a duty cycle equal to $N/2^R$, where N is the number being accumulated, and R is the bit width of the accumulator.

Let $2^B$ be equal to the number of bands into which the raster field is to be subdivided. Let frac( ) be the fractional portion of a given parenthetic expression, and in ( ) be the integer of a given parenthetic expression. Then frac(RasAddr$\times 2^B$) will subdivide a single band field.

There is a requirement for use of only half of the dynamic range of the duty cycle generator since, during the band, the required change in duty cycle ranges from 0% to 50%, etc., as described in the four cases above. Since R is the number of bits in the accumulator, let R−1 be the number of bits controlling the duty cycle from the device. This means that there are $2^{R-1}$ steps in a band, and N=int (frac(RasAddr$\times 2^B$)$\times 2^{R-1}$), where N varies from 0 to $2^{R-1}$.

The number N increments from 0 to $2^{(R-1)}-1$ repeatedly as RasAddr ascends. For example, for R=4, N ranges from 0 to 7. If the most significant bit of the adder input, the unused input, is asserted true during the leading band, then N will repeatedly increment from 8 to 15. Then, $N/2^R \times 100\%$ will range from 5% to about 94% in 8 steps. During the median width, control may be asserted to produce 100% duty cycle. This resultant signal may be applied to the select control line of the multiplexer, satisfying case 1, above.

Alternately, the most significant bit of the adder may be asserted false during the trailing band, causing a duty cycle output from 0 to almost 44%. By logically inverting this resultant signal from the carryout of the adder and applying it to the select control line of the multiplexer, the duty cycle of the RasAddr video will range from 100% to 56%. This satisfies case 2, above.

Cases 3 and 4 are automatically taken care of by the multiplexer as the logical complements of cases 1 and 2.

Although the duty cycle can express the temporal ratio between true and false in a logical signal, it does not contain information about the period of the signal. It is the intent here to make the duty cycle period less than that of a bit in the horizontal bit stream, so that the pulse width modulation will have the effect of vertically interpolating bits from adjacent rasters, according to the vertical position of the spot with respect to the raster boundaries. Indeed, the period of the select control line of the two-to-one multiplexer may be several times shorter than one bit, and it does not have to be synchronized with the bit clock.

Figure 4:
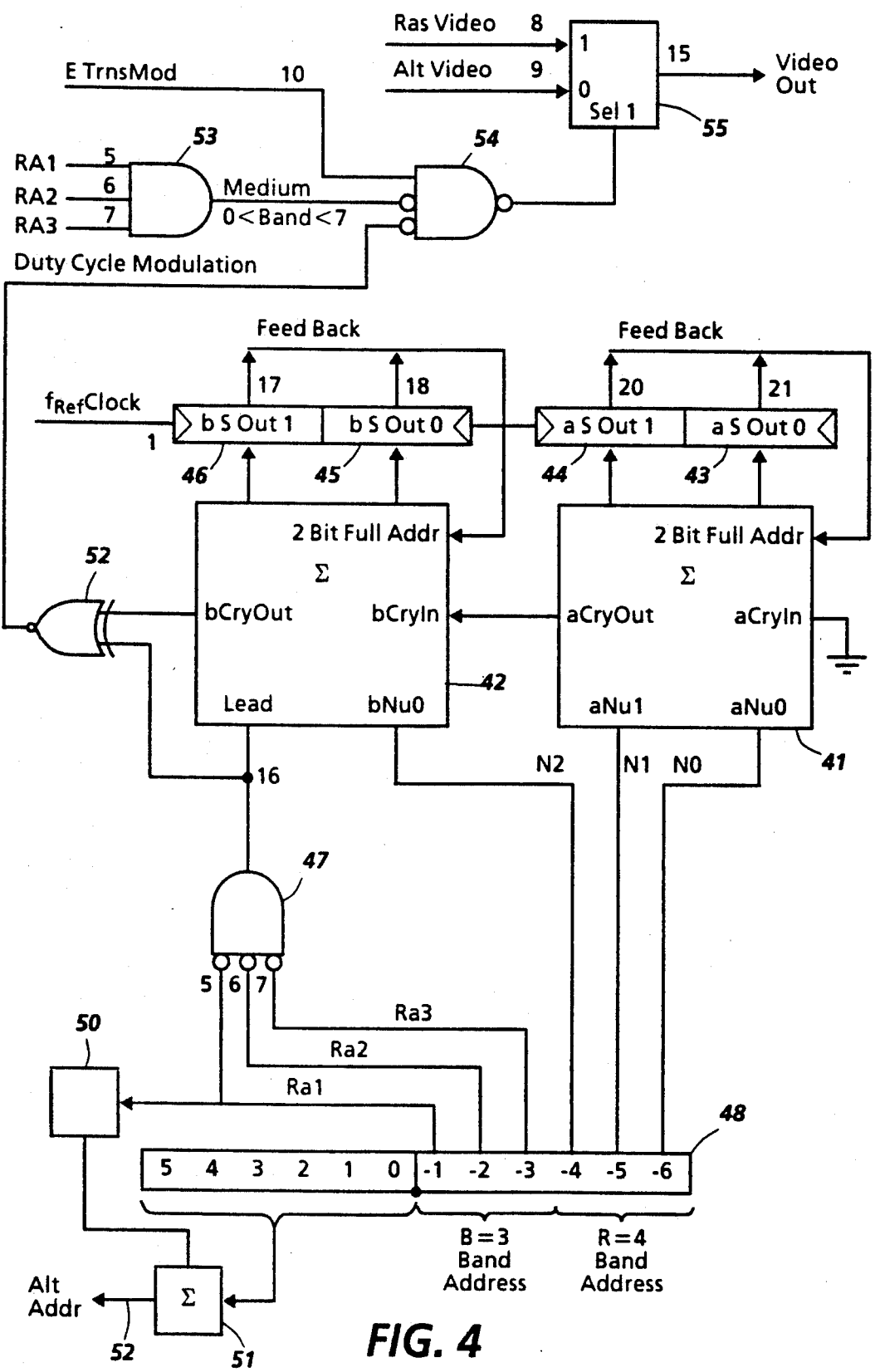
FIG. 4 is a block diagram of a circuit for implementing this circuit.

The variable duty cycle can be applied either in the fast scan direction along a horizontal distance of the scan on both sides of the transition point or in the process direction over a vertical distance to a fraction of a scan or to entire scans above and below the transition point. A circuit for this transition modulation in the process direction is shown in FIG. 4. A position sensor generates the raster photoreceptor position data as shown in FIG. 3, the data being stored and updated in the buffer 48 as shown in the form of six bits to the left of the decimal point, which corresponds to the eight raster bands, and six bits to the right of the decimal, corresponding to eight steps per band.

The least significant three bits of RasAddr are used as the input to the summer comprising two 2 bit adders 41, 42. If these three bits are all zeros, then the adder will not count at all, and the carry output, which is used as the duty cycle generator, will be ON all the time, representing a 100% duty cycle. As this number increases, the carry out will become more frequent, and when the input is all ONEs, the output will approach a 50% duty cycle.

The three bits to the right of the decimal point are sent to gate 53. When all inputs to this gate are either true or false, which corresponds to the leading or trailing band, the output will enable gate 54, which allows the duty cycle to drive the 2:1 mux 55. The inputs to this mux 55 are either the current raster video RasVideo, or either the previous or next video AltVideo. The duty cycle will enable one and then the other in the ratio of the duty cycle. The top input of gate 54 is an enable line.

Whether the AltVideo is the previous or next raster video is controlled by the flipflop 50 which generates a ONE or ZERO based on the state of the −1 bit which will be 0 for the leading band and 1 for the trailing band. This + or − bit is added to the raster number to generate the address of the AltVideo data.

Bits −1, −2 and −3 are used in gate 47 to determine if the current band is the leading band, in which case all bits would be zero. Then, summer 41, 42 will produce a duty cycle which varies from 50% to 100%. Otherwise, the duty cycle will go from 100% to 50% in the trailing band.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

I claim:

1. The method of switching rasters of video in the form of pixels from a first raster of video to a second raster of video of the same image in a raster output scanner having fast and slow scan directions, at a transition point in a scan without creating a visible artifact, each pixel comprising pulses which change between a first and second state, comprising the steps of:

determining a first point before said transition point in the fast scan direction and a second point after said transition point in the fast scan direction, continuously varying the duration of said pulses in said first and second states so that the pulses are in the first state most of the time at said first point, and in the second state most of the time at said second point, and applying the first raster of video during the time when the pulses are in the first state, and applying the second raster of video during the time when the pulses are in the second state.

2. The method of switching rasters of video in the form of pixels to a ROS having slow and fast scan directions from a first raster of video to a second raster of video of the same image at a transition line parallel to the fast scan direction without creating a visible transition artifact, each pixel comprising pulses which change between a first and a second state, comprising the steps of:

determining a first line parallel to said transition line above said transition line, and a second line parallel to said transition line below said transition line, continuously varying the duration of said pulses in said first and second states so that the pulses are in the first state most of the time at said first line and in the second state most of the time at said second line, and applying the first raster of video during the time when the pulses are in the first state, and applying the second raster of video during the time when the pulses are in the second state.

* * * * *